F. D. CALKINS.
COOKING UTENSIL.
APPLICATION FILED APR. 13, 1910. RENEWED MAY 7, 1912.
1,046,263.
Patented Dec. 3, 1912.
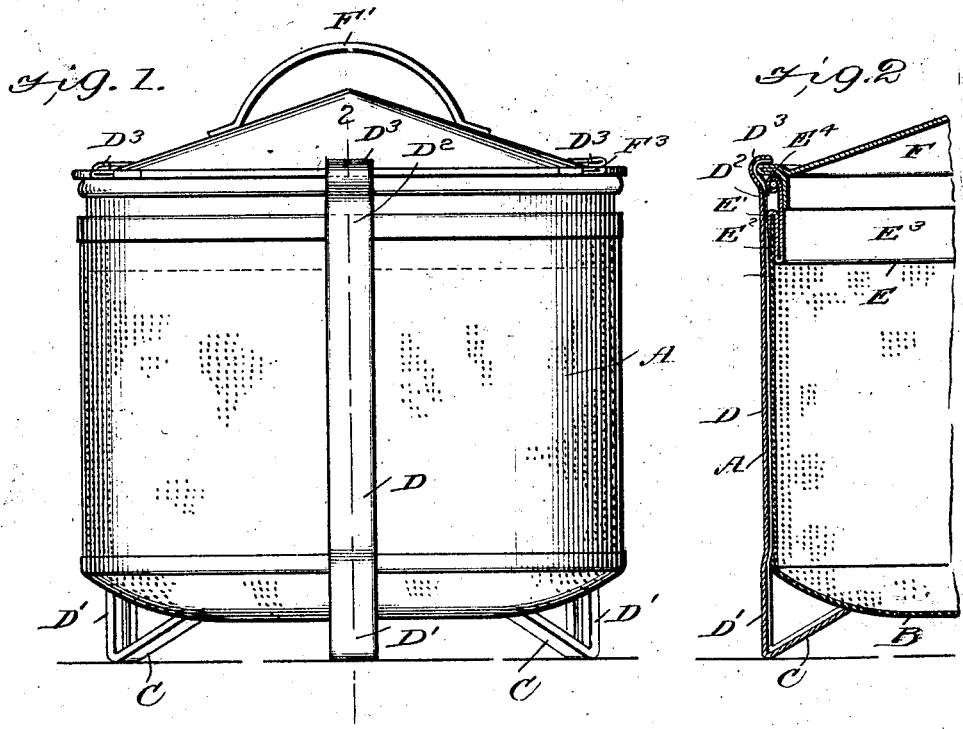
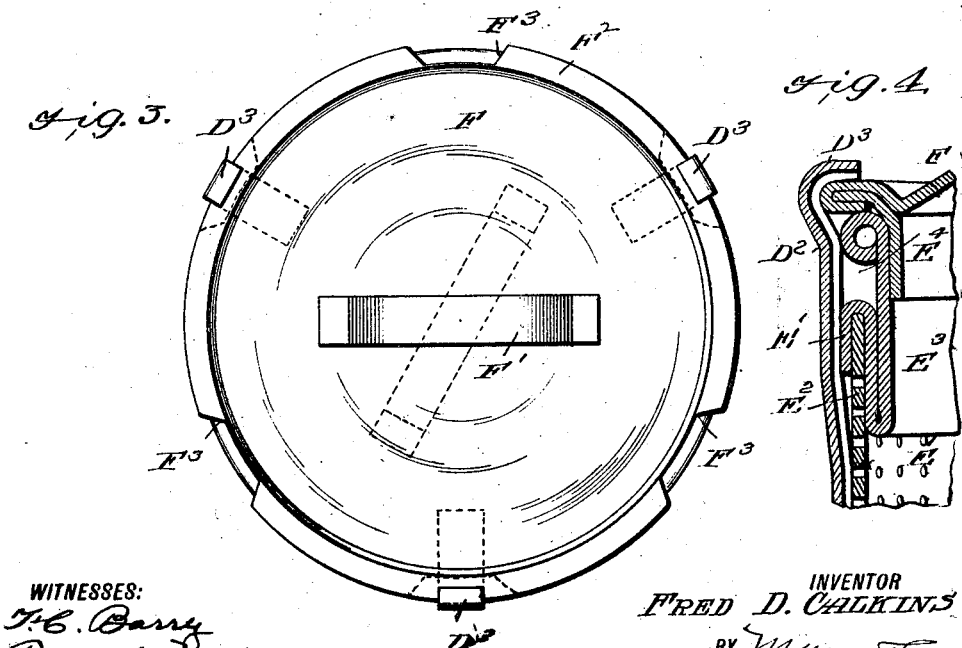
WITNESSES:
F. C. Barry
Perry B. Turpin
INVENTOR
FRED D. CALKINS
BY Munn & Co.
ATTORNEYS

UNITED STATES PATENT OFFICE.

FRED DORR CALKINS, OF WELSH, LOUISIANA.

COOKING UTENSIL.

1,046,263. Specification of Letters Patent. Patented Dec. 3, 1912.

Application filed April 13, 1910, Serial No. 555,213. Renewed May 7, 1912. Serial No. 695,782.

*To all whom it may concern:*

Be it known that I, FRED D. CALKINS, a citizen of the United States, and a resident of Welsh, in the parish of Calcasieu and State of Louisiana, have invented certain new and useful Improvements in Cooking Utensils, of which the following is a specification.

This invention in an improvement in cooking utensils being in the nature of a foraminous vessel designed for use in steaming, boiling, etc., within an outer vessel and the present invention relates particularly to the means for reinforcing the foraminated body by means which are extended at one end to serve as legs for supporting the vessel and at their other ends as fastening means for holding the lid in place; and the invention consists in certain novel constructions and combinations of parts as will be hereinafter described and claimed.

In the drawing Figure 1 is a side view of a vessel embodying my invention. Fig. 2 is a section thereof on about line 2—2 of Fig. 1. Fig. 3 is a top plan view of the vessel. Fig. 4 is a detail section enlarged showing the construction of the rim plate and the connection thereof with the upper edge of the body of the vessel and the reinforcing side bars.

The body A of the vessel is foraminous and may be of the usual perforated metal such as shown in Figs. 1 and 2 and the bottom B of the vessel may be of the same material and is rounded as shown in Figs. 1 and 2, forming an arch from side to side of the vessel at its bottom which arch forms a support or connection for one end of the strut brace C and which extends from the lower end of the leg extension D' of the reinforcing bar D as best shown in Figs. 1 and 2 of the drawings. This strut brace C, it will be noticed, not only operates as a support for the bottom B but also operates to brace the leg extension D' as is best shown in Fig. 2. In thus bracing the bottom B, it will be noticed that the strut C also operates when the vessel is lifted to support the bottom B from the leg extension D' so that the rounded bottom B is correlated with the strut C on the leg extension D' in providing the maximum strength in the bottom of the vessel.

At its upper edge the vessel A has a rim plate E which is secured at E' to the upper edge of the body A of the vessel, is crimped over the said upper edge and has a wing $E^2$ which depends within the vessel to a point below the wing E' and is thence returned forming the upwardly projecting wing $E^3$ which extends above the juncture of the wings E' and $E^2$ and is beaded at its upper edge at $E^4$ with the said bead approximately in line with the bend uniting the wings E' and $E^2$ so that the upward extension $D^2$ of the bars D may bear against the bead $E^4$ above which they are bent into the inwardly opening hooks $D^3$ for engagement with the notched flange at the outer edge of the cover F. This cover F has a suitable handle F' and is provided with a flange $F^2$ to rest upon the bead $E^4$ and has in said flange notches $F^3$ which may be registered with the hooks $D^3$ in applying and removing the lid so the said flange $F^2$ may be turned below the said hooks as shown in Fig. 3 to secure the cover in place upon the vessel. It will be noticed that the rim plate E strengthens and reinforces the upper edge of the body A, affords facilities by means of the wing E' for the secure connection of the bars D at the upper edge of the body E, and also provides for disposing the bead $E^4$, upon which the flange $F^2$ rests, in such manner that the said bead forms a second connection for the bars D at the upper end of the vessel and also provides for securing the lid in connection with the body of the vessel in such manner that the bars D and the rim plate E will bear all the strain incident to the connection of the parts D and the lid F with the upper end of the body of the vessel. This is accomplished in a simple manner and in a way designed to strengthen the vessel and render it more durable and efficient in use.

When the lid is applied as shown in Figs. 1 and 3 it may be used as a handle in raising and otherwise manipulating the vessel.

I claim:

1. The improvement herein described comprising the vessel body and bottom of foraminous material, the bottom being rounded forming an arch, a rim plate bent over the upper edge of the vessel body and having a wing depending therein and returned at its lower edge forming an upwardly projecting wing extending above said first wing and beaded at its upper edge in alinement with the portion of the plate bent over the upper edge of the vessel body, a lid having a notched flange resting on said bead, reinforcing side bars secured to the body of the vessel and extending above the same and secured to the bead of the rim plate and having above said bead, hooks coöperating with the notched flange of the lid and the said brace bars having leg extensions below the body of the vessel and provided with strut braces extending in and secured to the rounded bottom of the vessel, all substantially as and for the purposes set forth.

2. A vessel having a body portion of foraminous material and provided at its upper edge with a rim plate bent over the upper edge of the body portion and having an upwardly extending wing projecting above the upper edge of the vessel body and beaded at its upper edge in alinement with the body of the vessel, bars bracing the vessel body and extending above the same and secured to said bead and having, above the bead, hooks for securing the lid and the lid resting on the bead and notched for coöperation with the hooks of the brace bars, substantially as set forth.

3. A foraminous vessel having a body portion and a rounded or arched bottom, a lid fitted to the upper end of said body and notched for coöperation with fastening hooks, brace bars extending longitudinally throughout the body portion and projecting at their lower ends below said body portion and having their upper ends extending above the body portion and hooked to coöperate with the notched lid and strut braces between the lower ends of the brace bars and the rounded bottom, substantially as set forth.

4. A foraminous vessel comprising a body portion, brace bars secured thereto and having leg extensions below the body portion and extending at their upper ends above the body portion and hooked for engagement with a notched lid and a notched lid, all substantially as and for the purposes set forth.

FRED DORR CALKINS.

Witnesses:
 WM. CANELL BENJAMIN,
 W. E. CLERY.